Patented Feb. 15, 1949

2,462,037

UNITED STATES PATENT OFFICE 2,462,037

SEALING AND REINFORCING TAPE

Lewis Davis and Edwin C. Tuukkanen, Worcester, Mass., assignors to McLaurin-Jones Co., Brookfield, Mass., a corporation of Massachusetts No Drawing. Application January 11, 1943, Serial No. 472,002

3 Claims. (Cl. 117—122)

This invention relates to sealing and reinforcing tapes of the general character used in the manufacture and sealing of cartons and also in packaging various goods.

The use of tapes of this general type has greatly increased in recent months, not only because of the extraordinary demand for goods of nearly all kinds, but also for the reason that the wire, metal strapping, and similar banding materials widely used in packing goods for shipment are now practically unobtainable. As a result, a demand has arisen for better paper and fabric tapes which can be used in place of much of this metal strapping.

Because the strength of the tape is no better than the strength of the adhesive bond which holds it in place, these demands introduce serious problems of adhesion. It is essential that the adhesive used shall be waterproof (within the general meaning of that term); that its adhesive strength shall be retained throughout a wide range of temperatures running, for example, from 180° above zero F. to 20° below; that it shall not be affected materially by high humidities, and that it shall successfully withstand rough usage incident to the customary handling in shipping. It is also highly desirable that the adhesive coating on tape of this character shall be of such a nature that it can be applied either by using heat or solvents for softening the adhesive and rendering it tacky.

A further desirable characteristic for a tape of this nature, not as essential for many uses as are those above mentioned but highly advantageous in other cases, is that it shall be clean. This necessarily excludes constituents of the asphaltic or crude pitchy types.

To satisfy the foregoing requirements with available materials constitutes the chief object of this invention.

As a result of much research, we have found that this object can be realized very satisfactorily by using, as a coating for tapes of this type, an adhesive having the following composition:

| | Parts |
|---|---|
| Ethyl cellulose | 1 |
| Staybelite | 1 to 3 |
| Hercolyn | ½ to 1 |

The formula at present preferred consists of

| | Parts |
|---|---|
| Ethyl cellulose | 4 |
| Staybelite | 7 |
| Hercolyn | 2 | all the parts being by weight.

These constituents can be melted at temperatures running from about 240° to 280° F., applied to a web of backing material and the latter then cut into strips in the usual manner. Or, the constituents can be dissolved in ethyl alcohol, ethyl acetate, acetone, or toluol, and applied to the backing material in the form of a solution.

In this composition the Staybelite and the Hercolyn cooperate to form a strong adhesive, while the ethyl cellulose acts as a body material, its film-forming characteristics being very valuable for the purposes of this invention. It cooperates with the adhesive constituents just mentioned to produce a strong, tough, firmly adherent film serving to unite the backing material of the tape securely to the work.

Staybelite is a hydrogenated rosin and is available commercially in two forms known as A2 and A1. Either may be used in the formula above given, but the A2 variety is generally preferred.

Hercolyn is a liquid resin—dihydro methyl abietate—and serves both as a plasticizer and also as an adhesive constituent.

For a backing sheet we prefer to use either fabric or the plied paper stock known as Sisalkraft. It consists of two webs of kraft paper bonded together by an intermediate film of asphalt, with strong reinforcing fibers consisting of sisal, hemp, jute, or the like, dispersed in said film.

A tape of the character above described can be applied to cartons, or similar bodies, either with the aid of a sufficient degree of heat to soften the adhesive coating and make it tacky, or the softening operation can be performed with any of the solvents above mentioned. A solvent preferred for this purpose, however, consists of ethyl alcohol blended with equal amounts of ethyl acetate and acetone, or one composed of ethyl acetate and ethyl lactate in equal proportions. Another good solvent for this purpose consists of one part of butyl acetate, three parts of ethyl acetate, and one of the mono-ethyl-ether of ethylene glycol known commercially as Cellosolve. These solvents may be selected in accordance with the degree of volatility desired, the Cellosolve and ethyl acetate being rather slow to evaporate. This rate of evaporation is important where speed is required because the waterproof nature of the tape retards the evaporation of the solvent used in applying it. Tapes of this nature can be run satisfactorily in applying machines such as those shown, for example, in the McLaurin Patent No. 1,969,660, provided the tape is held against the carton or other article of work mechanically until after it has passed under the hot sealing plates. The tackiness of the adhesive made in accordance with the foregoing preferred formula begins at about 170° to 180° F. Or, the initial adhesion may be produced by means of a solvent and then completed by heat and pressure, as contemplated in the machine just referred to.

While the formula above given is that preferred, substitutes for the constituents above mentioned are available. For example, part, or all, of the ethyl cellulose may be replaced by vinyl chloride, vinyl acetate or the copolymers of these two vinyl compounds, or by polystyrene.

Instead of the Staybelite, Staybelite esters or the glycerine esters of rosin, known as ester gums, can be used. Also, rosin itself, although it is not as satisfactory because of its tendency to oxidize rapidly.

Part, or all, of the Hercolyn may be replaced by Abalyn (methyl abietate) or Flexalyn (diethylene glycol abietate). Some of the common lacquer plasticizers, such as dibutyl phthalate or tricresyl phosphate also may replace a substantial percentage of the Hercolyn.

Adhesives of the character above referred to are very useful in securing together the plies of laminated sheet materials from which cartons, multi-wall bags, and the like, are made. Also, as coatings for carton liners. Consequently, such liners, together with sealing and reinforcing tapes, will be hereinafter included in the term "sealing tapes."

Having thus described our invention, what we desire to claim as new is:

1. A sealing tape comprising a strip of backing material and a normally non-tacky coating thereon of a thermoplastic and solvent-applicable adhesive composition consisting essentially of

| | Parts |
|---|---|
| Ethyl cellulose | 1 |
| Hydrogenated rosin | 1 to 3 |
| Dihydro methyl abietate | 0.5 to 1 |

2. A sealing tape comprising a strip of backing material and a normally non-tacky coating thereon of a thermoplastic and solvent-applicable adhesive composition consisting essentially of

| | Parts |
|---|---|
| Ethyl cellulose | 4 |
| Hydrogenated rosin | 7 |
| Dihydro methyl abietate | 2 |

3. A sealing tape comprising a strip of backing sheet material and a coating thereon of a thermoplastic waterproof adhesive composition, soluble in a non-aqueous solvent and consisting essentially of ethyl cellulose, hydrogenated rosin and dihydro methyl abietate, the ethyl cellulose and the dihydro methyl abietate each not exceeding one-third by weight of the entire composition whereby the coating remains dry and non-tacky up to high atmospheric temperatures.

LEWIS DAVIS.
EDWIN C. TUUKKANEN.

REFERENCES CITED

The following references are of record in the file of this patent:

UNITED STATES PATENTS

| Number | Name | Date |
|---|---|---|
| 2,142,039 | Abrams et al. | Dec. 27, 1938 |